US012590656B2

(12) United States Patent
Chung

(10) Patent No.: US 12,590,656 B2
(45) Date of Patent: Mar. 31, 2026

(54) PIPE CONNECTION DEVICE FOR REPAIRS

(71) Applicant: Ho Gun Chung, Anyang-si (KR)

(72) Inventor: Ho Gun Chung, Anyang-si (KR)

( * ) Notice: Subject to any disclaimer, the term of this patent is extended or adjusted under 35 U.S.C. 154(b) by 422 days.

(21) Appl. No.: 18/502,247

(22) Filed: Nov. 6, 2023

(65) Prior Publication Data

US 2025/0146602 A1 May 8, 2025

(51) Int. Cl.
*F16L 21/035* (2006.01)
*F16L 21/00* (2006.01)
*F16L 55/16* (2006.01)

(52) U.S. Cl.
CPC ........... *F16L 21/002* (2013.01); *F16L 21/035* (2013.01); *F16L 55/1608* (2013.01)

(58) Field of Classification Search
CPC ....... F16L 21/002; F16L 21/02; F16L 33/225; F16L 19/0653; F16L 19/005; F16L 19/086; F16L 21/035; F16L 47/04; F16L 35/00; F16L 55/00; F16L 55/1608; F16L 19/0206; F16L 21/08; F16L 15/008; F16L 59/18
See application file for complete search history.

(56) References Cited

U.S. PATENT DOCUMENTS

| | | | |
|---|---|---|---|
| 7,498,509 B2 * | 3/2009 | Brotzell | F16L 19/083 |
| | | | 174/21 R |
| 8,110,741 B2 * | 2/2012 | Brotzell | F16L 47/04 |
| | | | 174/21 R |

| | | | |
|---|---|---|---|
| 8,360,478 B2 * | 1/2013 | Hurwitz | F16L 33/2076 |
| | | | 285/251 |
| 10,088,085 B2 * | 10/2018 | Saito | F16L 27/04 |
| 10,871,253 B2 * | 12/2020 | Kuhlhoff | F16L 47/12 |
| 2002/0163194 A1 * | 11/2002 | Mintz | F16L 37/252 |
| | | | 285/361 |
| 2010/0025991 A1 * | 2/2010 | Kim | F16L 19/086 |
| | | | 285/370 |
| 2012/0043752 A1 * | 2/2012 | Mcpherson | B29C 65/483 |
| | | | 285/285.1 |
| 2013/0099488 A1 * | 4/2013 | Gov | F16L 21/035 |
| | | | 29/428 |
| 2014/0300106 A1 * | 10/2014 | Kim | F16L 19/025 |
| | | | 285/354 |
| 2018/0142814 A1 * | 5/2018 | Eriksen | F16L 41/14 |
| 2020/0400256 A1 * | 12/2020 | Ting | F16L 37/146 |
| 2023/0408002 A1 * | 12/2023 | Towell | F16L 15/007 |

FOREIGN PATENT DOCUMENTS

KR 10-2013-0105958 A 9/2013

* cited by examiner

*Primary Examiner* — Dominick L Plakkoottam
(74) *Attorney, Agent, or Firm* — You & IP, LLC

(57) ABSTRACT

Disclosed is a pipe connection device for repairs that connects first and second pipes by extending a length of inner and outer connection pipes, wherein the first and second pipes are connected using the inner and outer connection pipes in a state in which the inner and outer connection pipes are fixed while extended to be proportional to a length between the first and second pipes by a detachment preventing protrusion being caught in and fixed to a detachment preventing groove while an inner catching step is caught on an outer catching step to limit sliding.

11 Claims, 8 Drawing Sheets

PIPE CONNECTION DEVICE FOR REPAIRS

BACKGROUND

Field of the Invention

The present disclosure relates to a pipe connection device, and more particularly, to a pipe connection device for repairs that includes inner and outer connection pipes inserted into and fastened to each other to connect first and second pipes and fastens and fixes a detachment preventing protrusion of the outer connection pipe so that the detachment preventing protrusion is caught in a detachment preventing groove of the inner connection pipe, thereby connecting the first and second pipes using the inner and outer connection pipes that are fixed while the length thereof is extended.

Discussion of Related Art

Generally, pipes buried and installed underground are damaged over time due to aging, corrosion, or external impacts, and a damaged pipe is repaired by cutting out a part where damage has occurred and then connecting the remaining parts of the pipe.

Here, as the part of the pipe is cut out, two pipes may be formed to be symmetrical to each other, and in this case, a connection pipe may be connected between a first pipe and a second pipe, which are symmetrical to each other, to connect the first pipe and the second pipe.

Patent Document 1 discloses a conventional pipe connector. Referring to Patent Document 1, first and second pipes are formed to be symmetrical to each other by cutting out a damaged part of a pipe, and the pipe connector includes an intermediate pipe reducing part having one end connected to surround an outer circumferential surface of the first pipe and the other end connected to be inserted into the second pipe to connect the first and second pipes.

Here, an inflow part is formed at the one end of the intermediate pipe reducing part that is connected to the first pipe, and an outflow part is formed at the other end of the intermediate pipe reducing part that is connected to the second pipe.

That is, when a fluid is supplied to the inflow part of the connector through the first pipe, the fluid moves to the outflow part through the intermediate pipe reducing part, and here, the fluid moves to the second pipe through the outflow part, and the first pipe and the second pipe are connected by the connector.

However, in Patent Document 1 described above, the connector formed to be relatively longer than a length between the first pipe and the second pipe cannot be placed between the first pipe and the second pipe, the length difference makes it impossible to connect the first pipe and the second pipe by inserting the inflow part of the connector into the first pipe or inserting the outflow part into the second pipe, it is not possible to accurately predict a depth of insertion of the connector because a depth of insertion of the inflow part or the outflow part into the first pipe or the second pipe cannot be limited when coupling the inflow part to the first pipe or coupling the outflow part to the second pipe, the connector is connected such that it is biased toward any one of the first pipe and the second pipe, and due to the biased connection of the connector, there is concern that the connector may be easily detached and separated from the first pipe or the second pipe due to the pressure of water passing through the first and second pipes. Accordingly, there is a problem that product reliability is degraded.

RELATED ART DOCUMENT

[Patent Document]
(Patent Document 1) KR 10-2013-0105958 A

SUMMARY OF THE INVENTION

The present disclosure is directed to providing a pipe connection device for repairs that includes an inner connection pipe including, at an outer surface thereof, a connection pipe exposed to an outside of a first pipe and having a detachment preventing groove formed to be recessed and a pipe expanding part expanding at a rear end of the connection pipe and forming an outer catching step between the connection pipe and the pipe expanding part, and an outer connection pipe inserted and coupled to surround the outer surface of the inner connection pipe and including a detachment preventing protrusion formed on an inner circumferential surface of one end in order to be caught in and fixed to the detachment preventing groove, the other end fastened to surround an outer surface of a second pipe to connect the inner connection pipe and the second pipe, and an inner catching step formed on an inner circumferential surface in order to be caught on the outer catching step and limit an insertion depth to which the inner connection pipe is inserted into the outer connection pipe, wherein, when the inner connection pipe and the outer connection pipe, which are positioned between the first pipe and the second pipe, are moved in a sliding manner so that a length of the inner and outer connection pipes extends, and the inner connection pipe is inserted into the first pipe while the outer connection pipe is fastened to surround an outer side of the second pipe, the inner catching step of the outer connection pipe is caught on the outer catching step of the inner connection pipe such that sliding of the inner and outer connection pipes is limited, and simultaneously, the detachment preventing protrusion is caught in and fixed to the detachment preventing groove, and thus the inner and outer connection pipes connect the first and second pipes while fixed in an extended state to be proportional to a length between the first and second pipes.

The present disclosure provides a pipe connection device for repairs, the pipe connection device including: an inner connection pipe, which has a hollow shape whose front and rear portions are open and has a connection pipe formed at one end in order to be inserted into a first pipe cut to have a predetermined length, a detachment preventing groove formed to be recessed along an outer surface of the connection pipe and exposed to an outside of the first pipe, and a pipe expanding part formed to expand at a rear end of the connection pipe and forming an outer catching step between the connection pipe and the pipe expanding part; and an outer connection pipe, which has a hollow shape whose front and rear portions are open, is inserted and coupled to surround an outer surface of the inner connection pipe, and has a detachment preventing protrusion formed to protrude along an inner circumferential surface of one end to correspond to the detachment preventing groove and be caught in and fixed to the detachment preventing groove, the other end fastened to surround an outer surface of a second pipe, which is cut and faces the first pipe, to connect the inner connection pipe and the second pipe, and an inner catching step formed on an inner circumferential surface in order to be caught on the outer catching step and prevent the inner connection pipe from being inserted to a predetermined depth or more into the outer connection pipe.

In the pipe connection device according to the present disclosure, the detachment preventing groove of the inner connection pipe may be formed as a plurality of detachment preventing grooves spaced apart at predetermined intervals in a longitudinal direction of the outer surface of the inner connection pipe, and the detachment preventing protrusion of the outer connection pipe may be formed as a plurality of detachment preventing protrusions that are proportional to the number of detachment preventing grooves, spaced apart at predetermined intervals, and caught in the detachment preventing grooves.

In the pipe connection device according to the present disclosure, the detachment preventing groove may be formed to be recessed in a polygonal shape to allow the detachment preventing protrusion to be inserted thereinto and prevent the detachment preventing protrusion from being detached.

In the pipe connection device according to the present disclosure, the outer connection pipe may further include a limiting step part configured to force the other end of the pipe expanding part of the inner connection pipe to be caught on a rear end of the inner catching step to block the inner connection pipe from moving backward toward the other end of the outer connection pipe.

In the pipe connection device according to the present disclosure, the limiting step part may further include: an inclined surface portion formed to extend to be inclined downward from the inner circumferential surface of the outer connection pipe toward a central portion thereof to guide the pipe expanding part of the inner connection pipe to move over the inclined surface portion; and a perpendicular surface portion formed to be perpendicular from a tip of the inclined surface portion toward the inner circumferential surface of the outer connection pipe to cause the other end of the pipe expanding part of the inner connection pipe to come in close contact with and be caught on the perpendicular surface portion.

In the pipe connection device according to the present disclosure, the outer connection pipe may further include an insertion limiting step formed to be recessed from an inner circumferential surface of a rear end toward an outer circumferential surface thereof and allow the second pipe to be caught thereon to limit a depth to which the outer connection pipe is inserted toward the second pipe.

In the pipe connection device according to the present disclosure, the inner connection pipe may have a first O-ring formed in a gap between the connection pipe and the first pipe to prevent a fluid from leaking through the gap between the first pipe and the connection pipe, and the outer connection pipe may have a first O-ring formed in a gap with the second pipe to prevent a fluid from leaking through the gap with the second pipe.

In the pipe connection device according to the present disclosure, a second O-ring may be installed in a gap between the outer connection pipe and the connection pipe of the inner connection pipe and a gap between the outer connection pipe and the pipe expanding part of the inner connection pipe to prevent a fluid from leaking through the gaps between the inner and outer connection pipes.

In the pipe connection device according to the present disclosure, the inner connection pipe may further include an adapter, which has a hollow shape whose front and rear portions are open and has one end inserted and fastened to surround an outer surface of the first pipe and the other end into which one end of the connection pipe is allowed to be inserted and fastened to connect the first pipe and the connection pipe.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
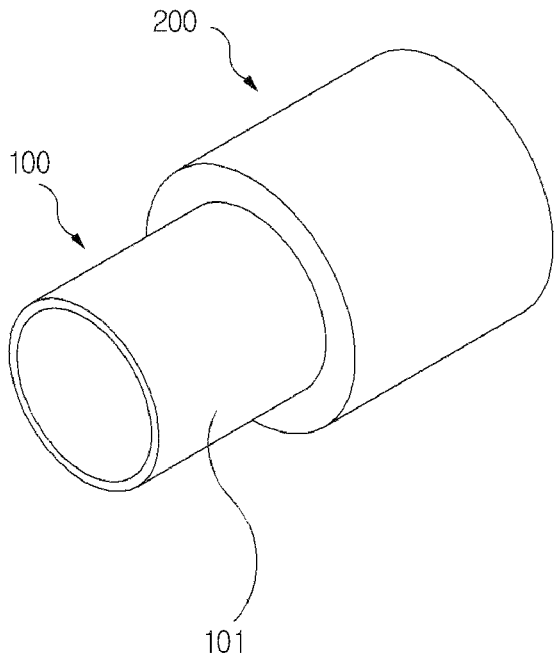
FIG. 1 is a perspective view illustrating a pipe connection device for repairs according to the present disclosure.
Figure 2:
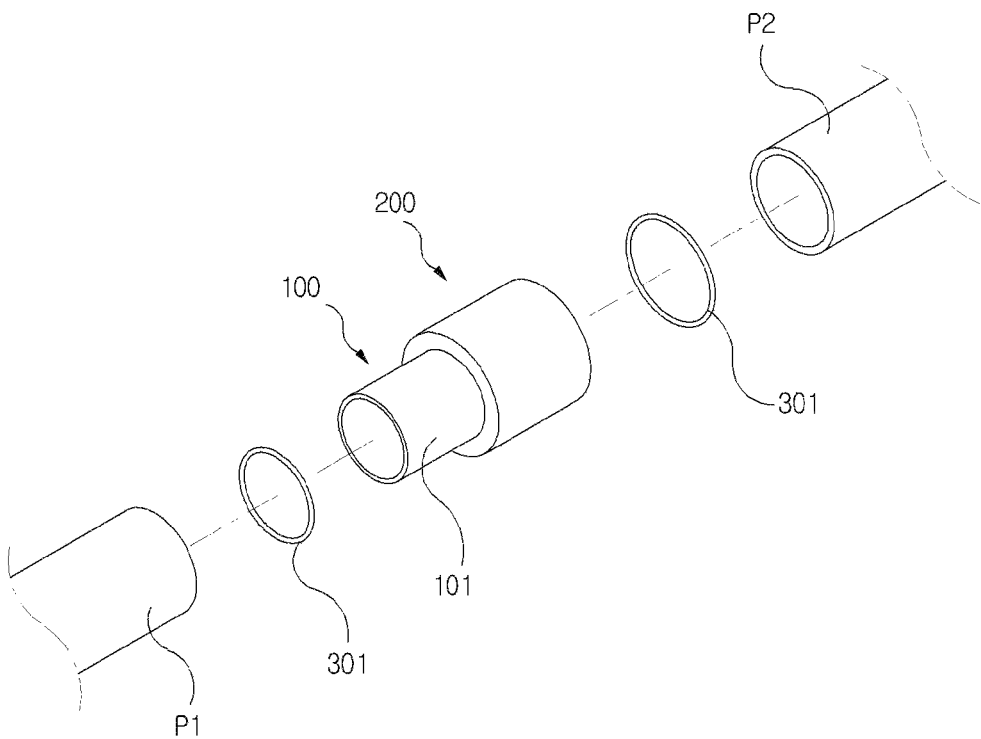
FIG. 2 is a perspective view illustrating a state in which the pipe connection device for repairs according to the present disclosure is positioned between first and second pipes.
Figure 3:
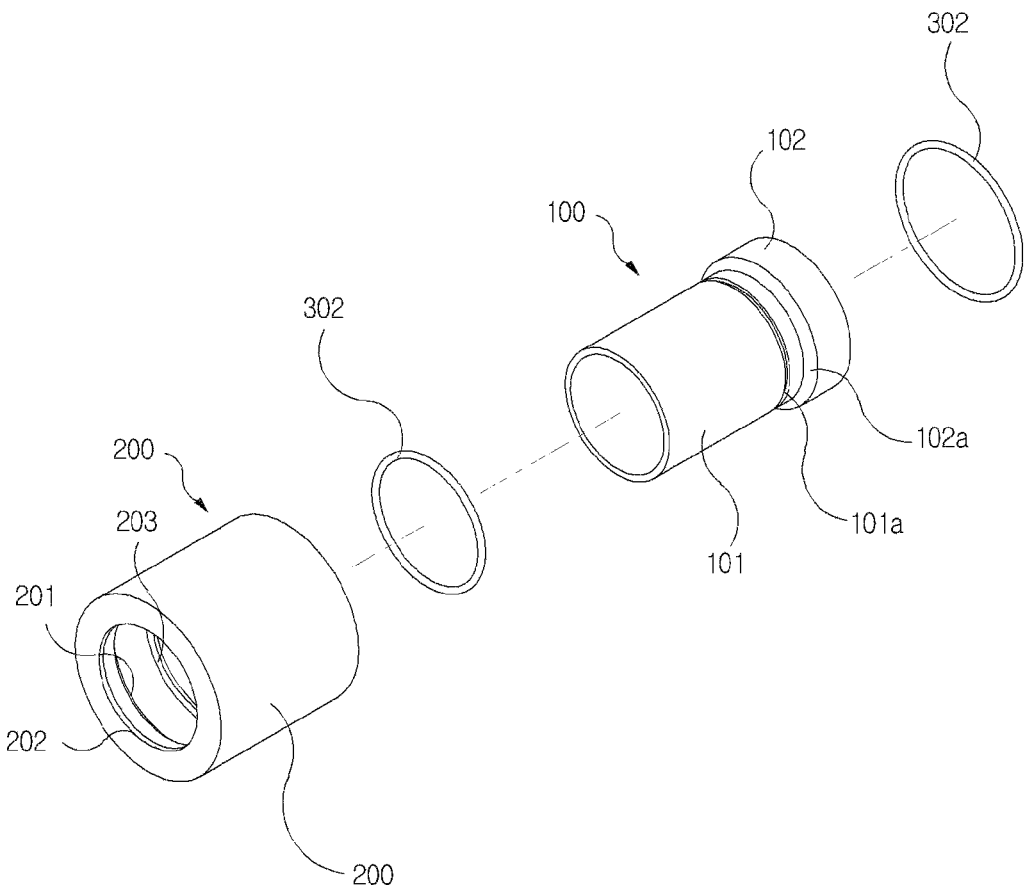
FIG. 3 is an exploded perspective view of FIG. 1.
Figure 4:
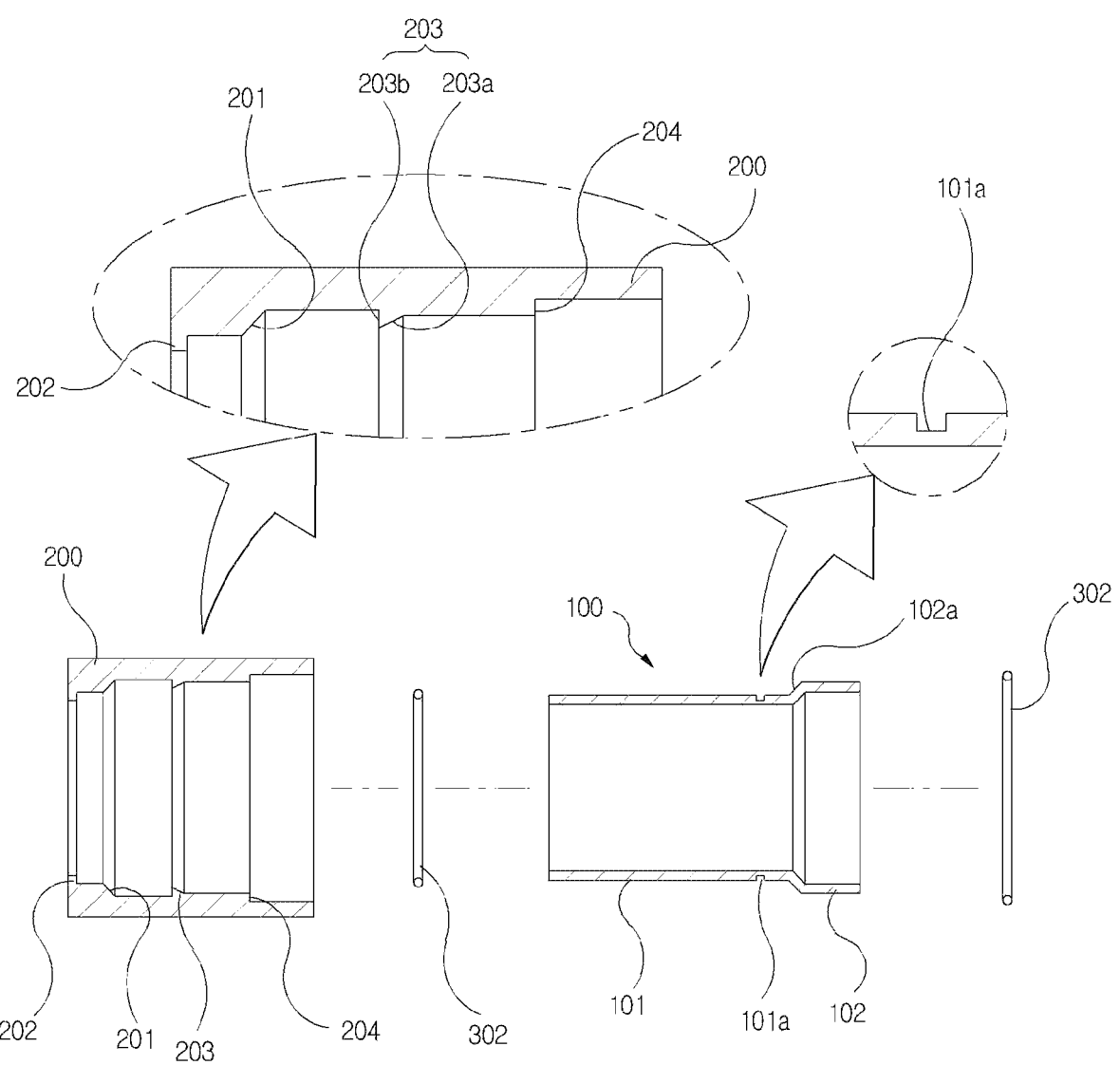
FIG. 4 is an exploded lateral cross-sectional view of the pipe connection device for repairs according to the present disclosure.
Figure 5:
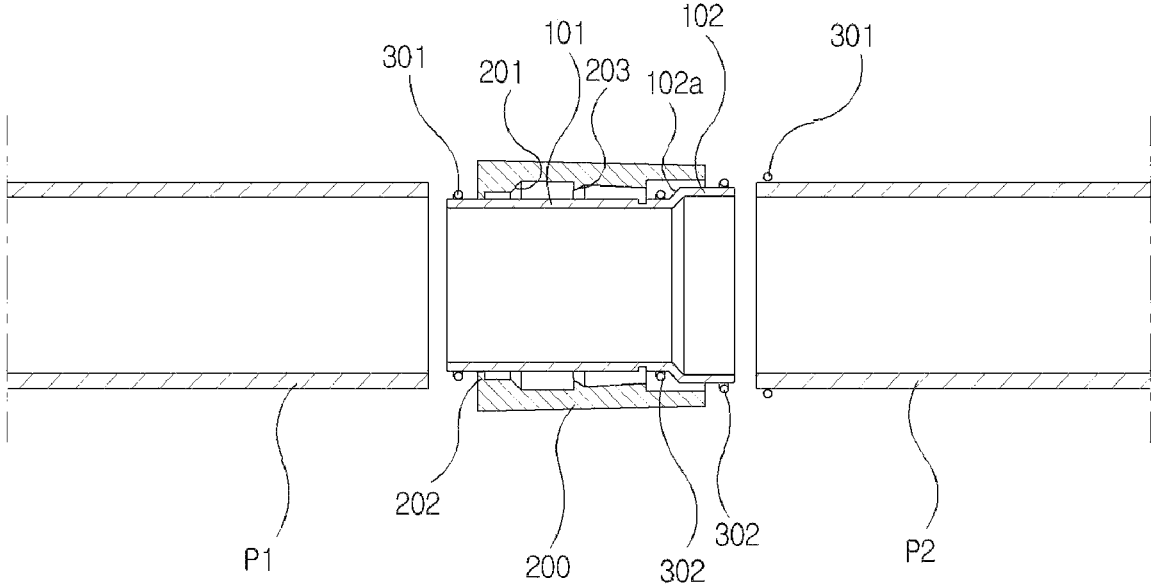
FIG. 5 is a lateral cross-sectional view illustrating a state in which inner and outer connection pipes of the pipe connection device for repairs according to the present disclosure are coupled and positioned between the first and second pipes.
Figure 6:
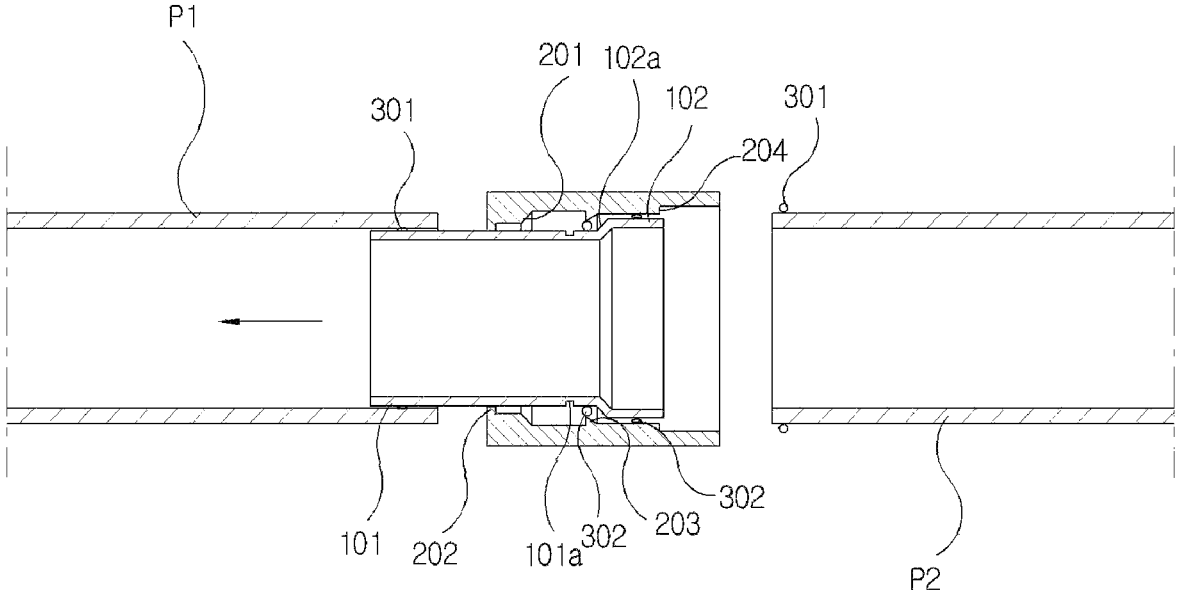
FIG. 6 is a lateral cross-sectional view illustrating a state in which the pipe connection device for repairs according to the present disclosure is connected to the first pipe.
Figure 7:
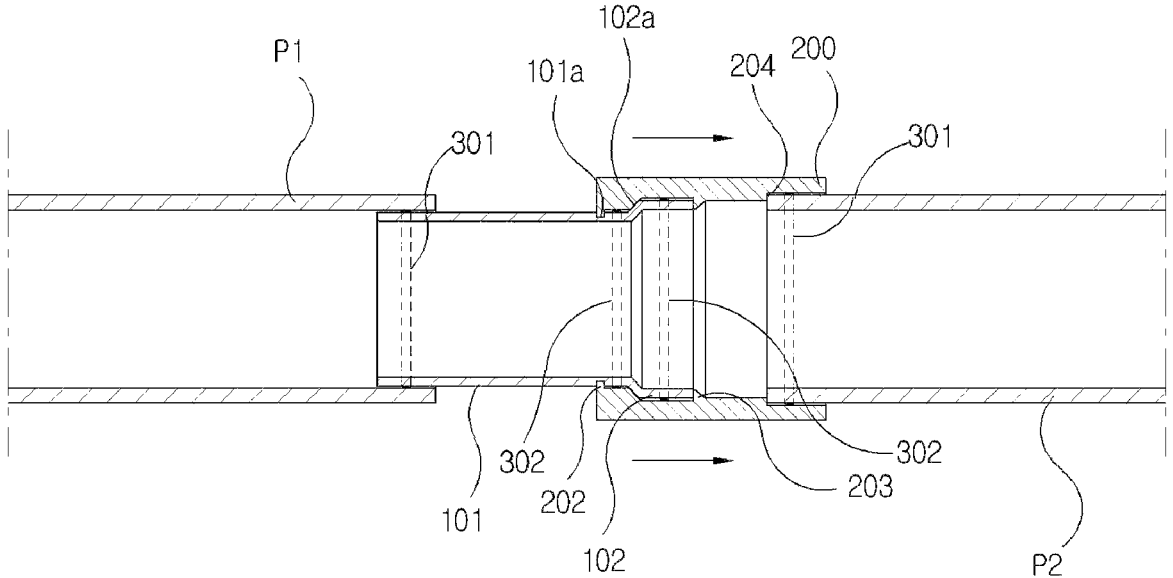
FIG. 7 is a lateral cross-sectional view illustrating a state in which the outer connection pipe of the pipe connection device for repairs according to the present disclosure is connected to the second pipe.
Figure 8:
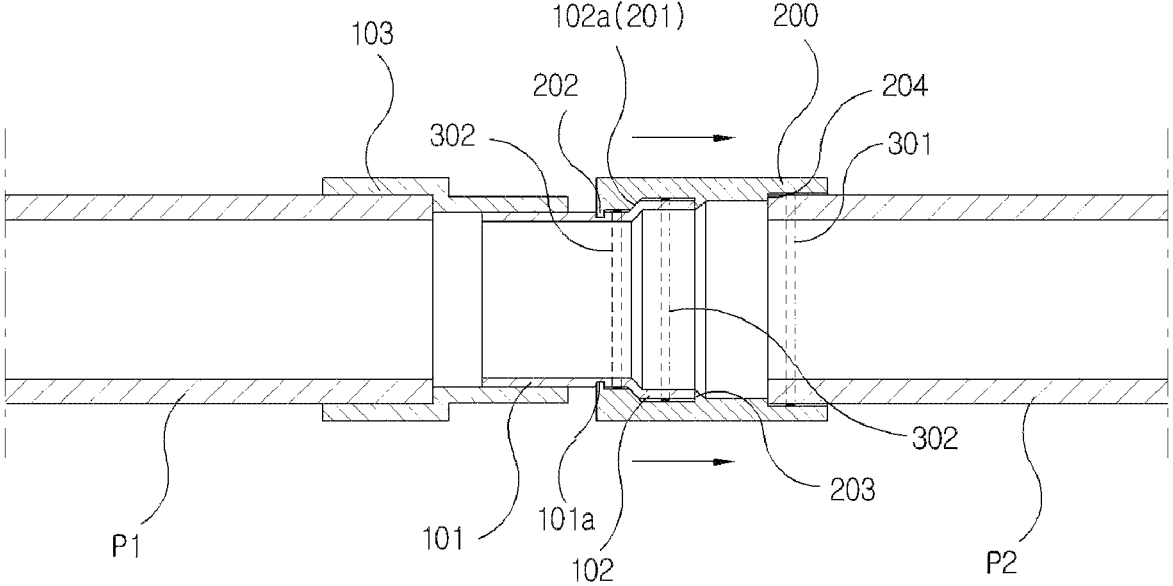
FIG. 8 is a lateral cross-sectional view illustrating a state in which the first pipe and the inner connection pipe of the pipe connection device for repairs according to the present disclosure are connected using an adapter.

Hereinafter, embodiments of the present disclosure will be described in more detail with reference to the accompanying drawings.

An inner connection pipe 100 has a hollow shape whose front and rear portions are open and has a connection pipe 101 formed at one end in order to be inserted into a first pipe P1 cut to have a predetermined length, a detachment preventing groove 101a formed to be recessed along an outer surface of the connection pipe 101 and exposed to an outside of the first pipe P1, and a pipe expanding part 102 formed to expand from a rear end of the connection pipe 101 and forming an outer catching step 102a between the connection pipe 101 and the pipe expanding part 102.

A length of the inner connection pipe 100 is formed to be relatively longer than a length of an outer connection pipe 200, and the inner connection pipe 100 connects the outer connection pipe 200 and the first pipe P1.

In the inner connection pipe 100, a diameter of the connection pipe 101 is formed to be relatively smaller than a diameter of an inner circumferential surface of the outer connection pipe 200.

The connection pipe 101 of the inner connection pipe 100 is exposed at one end of the outer connection pipe 200 and is inserted into and coupled to the first pipe.

An adhesive is applied between the connection pipe 101 and the first pipe P1, and as the connection pipe 101 dissolves due to the adhesive, the connection pipe 101 is adhered to an outer circumferential surface of the first pipe P1 and seals a gap between the connection pipe 101 and the first pipe P1.

An adhesive is applied between the connection pipe 101 and the outer connection pipe 200, and as the connection pipe 101 dissolves due to the adhesive, the connection pipe 101 is adhered to the inner circumferential surface of the outer connection pipe 200 and seals a gap between the connection pipe 101 and the outer connection pipe 200.

The detachment preventing groove 101a of the connection pipe 101 allows a detachment preventing protrusion 202 of the outer connection pipe 200 to be caught therein and fixed thereto so that the one end of the outer connection pipe 200 is positioned to be fixed to a rear end of the connection pipe 101 of the inner connection pipe 100.

The detachment preventing groove 101a of the inner connection pipe 100 is formed as a plurality of detachment preventing grooves 101a spaced apart at predetermined intervals in a longitudinal direction of an outer surface of the inner connection pipe 100.

The detachment preventing groove 101a is formed to be recessed in a polygonal shape to allow insertion of the detachment preventing protrusion 202 and prevent the detachment preventing protrusion 202 from being detached.

The detachment preventing groove 101a may be formed to be recessed in a right triangle structure with respect to a direction of insertion of the detachment preventing protrusion 202 to allow insertion of the detachment preventing protrusion 202 and block detachment of the detachment preventing protrusion 202.

The inner connection pipe 100 has a first O-ring 301 formed in a gap between the connection pipe 101 and the first pipe P1 to prevent a fluid from leaking through the gap between the first pipe P1 and the connection pipe 101.

The first O-ring 301 is pressed in a gap between the outer circumferential surface of the first pipe P1 and an inner circumferential surface of the connection pipe 101 to seal the gap between the first pipe P1 and the connection pipe 101.

In the inner connection pipe 100, a recessed groove (not illustrated) into which the first O-ring 301 and a second O-ring 302 are fitted and inserted is formed in outer surfaces of a front end and a rear end of the connection pipe 101 and an outer surface of the pipe expanding part 102 in order to prevent the first O-ring 301 and the second O-ring 302 from moving due to being pushed in the process of inserting and coupling the connection pipe 101 into the first pipe P1 or inserting and coupling the inner connection pipe 100 into the outer connection pipe 200.

The pipe expanding part 102 is formed to be proportional to a diameter of the inner circumferential surface of the outer connection pipe 200 or formed to be relatively smaller than the diameter of the inner circumferential surface of the outer connection pipe 200.

The other end of the pipe expanding part 102 is caught on and fixed to a limiting step part 203 of the outer connection pipe 200 to prevent the inner connection pipe 100 from moving backward toward a second pipe P2 in the outer connection pipe 200.

The outer catching step 102a of the pipe expanding part 102 allows an inner catching step 201 of the outer connection pipe 200 to be caught thereon to limit a sliding distance of the outer connection pipe 200 that slides in a direction opposite to the inner connection pipe 100.

The second O-ring 302 is installed in a gap between the outer connection pipe 200 and the connection pipe 101 of the inner connection pipe 100 and a gap between the outer connection pipe 200 and the pipe expanding part 102 of the inner connection pipe 100 to prevent a fluid from leaking through the gaps between the inner and outer connection pipes 100 and 200.

The second O-ring 302 is pressed between an outer circumferential surface of the connection pipe 101 and the inner circumferential surface of the outer connection pipe 200 and between the outer surface of the pipe expanding part 102 and the inner circumferential surface of the outer connection pipe 200 to seal the gap between the connection pipe 101 and the outer connection pipe 200 and the gap between the pipe expanding part 102 and the outer connection pipe 200.

The inner connection pipe 100 further includes an adapter 103, which has a hollow shape whose front and rear portions are open and has one end inserted and fastened to surround an outer surface of the first pipe P1 and the other end into which one end of the connection pipe 101 is allowed to be inserted and fastened, thereby connecting the first pipe P1 and the connection pipe 101.

When the diameter of the inner connection pipe 100 is formed to be larger than the diameter of an inner circumferential surface of the first pipe P1, the adapter 103 is fastened to the outer circumferential surface of the first pipe P1 to connect the first pipe P1 and the inner connection pipe 100.

The outer connection pipe 200 has a hollow shape whose front and rear portions are open, is inserted and coupled to surround an outer surface of the inner connection pipe 100, and has the detachment preventing protrusion 202 formed to protrude along an inner circumferential surface of one end to correspond to the detachment preventing groove 101a and be caught in and fixed to the detachment preventing groove 101a, the other end fastened to surround an outer surface of a second pipe P2, which is cut and faces the first pipe P1, to connect the inner connection pipe 100 and the second pipe P2, and the inner catching step 201 formed on an inner circumferential surface in order to be caught on the outer catching step 102a and prevent the inner connection pipe 100 from being inserted at a predetermined depth or more into the outer connection pipe 200.

In a state in which the outer connection pipe 200 is positioned near the first pipe P1 due to the inner connection pipe 100 inserted into the first pipe P1, the outer connection pipe 200 slides along the inner connection pipe 100 in a direction opposite to the first pipe P1 and is fastened to surround an outer surface of the second pipe P2.

The outer connection pipe 200 connects the inner connection pipe 100 and the second pipe P2 and guides a fluid moving through the inner connection pipe 100 to move to the second pipe P2.

The inner catching step 201 is caught on the outer catching step 102a of the inner connection pipe 100 to limit a moving distance of the outer connection pipe 200 that slides along the inner connection pipe 100.

When one end of the outer connection pipe 200 is coupled to the inner connection pipe 100 by sliding, the one end of the outer connection pipe 200 is expanded to be proportional to a height of the detachment preventing protrusion 202 and slides along an outer circumferential surface of the inner connection pipe 100.

The detachment preventing protrusion 202 moves over the outer circumferential surface of the connection pipe 101 of the inner connection pipe 100 due to sliding of the outer connection pipe 200, and then, once the detachment preventing protrusion 202 reaches the detachment preventing groove 101*a*, the one end of the outer connection pipe 200 is restored to its original state, and the detachment preventing protrusion 202 is caught in and fixed to the detachment preventing groove 101*a*.

The detachment preventing protrusion 202 of the outer connection pipe 200 is formed as a plurality of detachment preventing protrusions 202 that are proportional to the number of detachment preventing grooves 101*a*, spaced apart at predetermined intervals, and caught in the detachment preventing grooves 101*a*.

The detachment preventing protrusion 202 may be provided as a plurality of detachment preventing protrusions 202, and the plurality of detachment preventing protrusions 202 may be simultaneously caught in and fixed to the plurality of detachment preventing grooves 101*a*.

The detachment preventing protrusion 202 may be formed in a polygonal shape to correspond to the shape of the detachment preventing groove 101*a* and may be inserted into the detachment preventing groove 101*a* and caught in and fixed to the detachment preventing groove 101*a*.

The outer connection pipe 200 further includes the limiting step part 203 configured to force the other end of the pipe expanding part 102 of the inner connection pipe 100 to be caught on a rear end of the inner catching step 201 to block the inner connection pipe 100 from moving backward toward the other end of the outer connection pipe 200.

The limiting step part 203 allows passage of the pipe expanding part 102 therethrough in a state in which the limiting step part 203 is expanded due to being pressed by the pipe expanding part 102, and at the time the pipe expanding part 102 passes through the limiting step part 203, the limiting step part 203 is restored to its original state and caught on the other end of the pipe expanding part 102, thereby blocking the pipe expanding part 102 from moving backward in the outer connection pipe 200.

The limiting step part 203 further includes an inclined surface portion 203*a* formed to extend to be inclined downward from the inner circumferential surface of the outer connection pipe 200 toward a central portion thereof to guide the pipe expanding part 102 of the inner connection pipe 100 to move over the inclined surface portion 203*a* and a perpendicular surface portion 203*b* formed to be perpendicular from a tip of the inclined surface portion 203*a* toward the inner circumferential surface of the outer connection pipe 200 to cause the other end of the pipe expanding part 102 of the inner connection pipe 100 to come in close contact with and be caught on the perpendicular surface portion 203*b*.

The inclined surface portion 203*a* guides the pipe expanding part 102 to slide thereover and is expanded due to being widened outward by the pipe expanding part 102.

The perpendicular surface portion 203*b* firmly fixes the other end of the pipe expanding part 102 so that the other end of the pipe expanding part 102 is caught thereon and blocks backward movement of the inner connection pipe 100.

The outer connection pipe 200 further includes an insertion limiting step 204 formed to be recessed from an inner circumferential surface of a rear end toward an outer circumferential surface thereof and allow the second pipe P2 to be caught thereon to limit a depth to which the outer connection pipe 200 is inserted toward the second pipe P2.

The insertion limiting step 204 is formed to be relatively smaller than the diameter of the second pipe P2 to limit the depth of insertion of the outer connection pipe 200.

The insertion limiting step 204 blocks the connection pipe 101 fastened to the first pipe P1 from being detached and separated from the first pipe P1 due to the outer connection pipe 200 inserted toward the second pipe P2.

In the outer connection pipe 200, a recessed groove (not illustrated) into which the first O-ring 301 is fitted and inserted is formed in an inner circumferential surface, into which the second pipe P2 is inserted, in order to prevent the second O-ring 302 from moving due to being pushed when the outer connection pipe 200 is inserted and coupled toward the second pipe P2.

An adhesive is applied between the outer connection pipe 200 and the second pipe P2, and as the outer connection pipe 200 dissolves due to the adhesive, the outer connection pipe 200 is adhered to an inner circumferential surface of the second pipe P2 and seals a gap between the outer connection pipe 200 and the second pipe P2.

The pipe connection device for repairs according to the present disclosure configured as described above is used as follows.

First, a part (for example, a damaged part) of a pipe whose outer portion is damaged due to aging or corrosion is cut out to form the first and second pipes P1 and P2, which are formed to be symmetrical to each other at the cut portion of the pipe.

Then, the connection pipe 101 of the inner connection pipe 100 is inserted through an opening opposite to the inner catching step 201 of the outer connection pipe 200 so that a portion of the connection pipe 101 is exposed at one end of the outer connection pipe 200.

Here, by sliding the inner connection pipe 100 along the outer connection pipe 200, a length from one end of the connection pipe 101 of the inner connection pipe 100 to the other end of the outer connection pipe 200 is formed to be relatively shorter than a length between the first and second pipes P1 and P2 to place the inner and outer connection pipes 100 and 200 in the space between the first pipe P1 and the second pipe P2.

Next, the connection pipe 101 of the inner connection pipe 100 that is exposed at the one end of the outer connection pipe 200 is inserted into the first pipe P1 to connect the inner connection pipe 100 and the first pipe P1.

Here, before inserting the inner connection pipe 100 into the first pipe P1, the first O-ring 301 is coupled to an outer surface of the connection pipe 101 of the inner connection pipe 100, and in this state, the inner connection pipe 100 is inserted into the first pipe P1. In this way, as the first O-ring 301 is pressed between the connection pipe 101 and the first pipe P1, a gap between the connection pipe 101 and the first pipe P1 is sealed.

Then, when the outer connection pipe 200 is moved to slide toward the second pipe P2 along the connection pipe 101 of the inner connection pipe 100, the inner catching step 201 of the outer connection pipe 200 is moved toward the outer catching step 102*a* and caught on the outer catching step 102*a*, and here, movement of the outer connection pipe 200 is limited.

Here, the outer connection pipe 200 sliding along the inner connection pipe 100 is inserted and coupled to surround and cover the outer circumferential surface of the second pipe P2 and connects the inner connection pipe 100 and the second pipe P2.

In particular, the detachment preventing protrusion 202 reaches the detachment preventing groove 101*a* of the inner connection pipe 100 at the same time as the inner catching step 201 is caught on the outer catching step 102*a*, and here, as one end of the outer catching step 102*a* is restored to its original state, the detachment preventing protrusion 202 is inserted into the detachment preventing groove 101*a* and is caught in and fixed to the detachment preventing groove 101*a*.

Also, the detachment preventing groove 101*a* is formed as a plurality of detachment preventing grooves 101*a* in a longitudinal direction of the outer surface of the connection pipe 101, and the plurality of detachment preventing grooves 101*a* allow the plurality of detachment preventing protrusions 202 to be caught therein. In this way, the inner and outer connection pipes 100 and 200 may be firmly fixed.

Here, the detachment preventing protrusion 202 of the outer connection pipe 200 slides toward the detachment preventing groove 101*a* while in close contact with the outer circumferential surface of the connection pipe 101, and in this way, the detachment preventing protrusion 202 slides along the connection pipe 101 in a state in which one end of the outer connection pipe 200 is expanded to be proportional to the height of the detachment preventing protrusion 202, and once the detachment preventing protrusion 202 reaches the detachment preventing groove 101*a*, the one end of the outer connection pipe 200 is restored to its original state, and the detachment preventing protrusion 202 is inserted into the detachment preventing groove 101*a*.

Also, during sliding of the outer connection pipe 200, the inclined surface portion 203*a* of the limiting step part 203 comes in close contact with the other end of the pipe expanding part 102 of the inner connection pipe 100, and then, as the other end of the pipe expanding part 102 presses the inclined surface portion 203*a* outward, the pipe expanding part 102 moves over the inclined surface portion 203*a*.

That is, the pipe expanding part 102 passes in a state in which the inclined surface portion 203*a* is pressed such that the inner circumferential surface of the outer connection pipe 200 is expanded to be proportional to the diameter of the pipe expanding part 102, and here, once the other end of the pipe expanding part 102 reaches the perpendicular surface portion 203*b* via the inclined surface portion 203*a*, the diameter of the inner circumferential surface of the outer connection pipe 200 is restored to its original state, and the other end of the pipe expanding part 102 is caught on the perpendicular surface portion 203*b*.

Then, the detachment preventing protrusion 202 of the outer connection pipe 200 primarily caught in the detachment preventing groove 101*a*, and simultaneously, the other end of the pipe expanding part 102 is secondarily caught on the limiting step part 203. In this way, a state in which the length of the inner connection pipe 100 and the outer connection pipe 200 is extended and fixed is maintained.

In particular, the outer connection pipe 200 inserted into and coupled to the second pipe P2 causes the end of the second pipe P2 to come in close contact with and be caught on the insertion limiting step 204. In this way, the outer connection pipe 200 is prevented from being inserted to a predetermined depth or more toward the second pipe P2, and simultaneously, movement of the outer connection pipe 200 is limited, thereby preventing the connection pipe 101 from being detached and separated from the first pipe P1.

That is, due to sliding of the outer connection pipe 200, during the operation in which the inner catching step 201 comes in close contact with and is caught on the outer catching step 102*a*, the operation in which the detachment preventing protrusion 202 is caught in and fixed to the detachment preventing groove 101*a*, the other end of the pipe expanding part 102 comes in close contact with and is caught on the limiting step part 203, and the end of the second pipe P2 comes in close contact with the insertion limiting step 204 is simultaneously performed, and the first pipe P1 and the second pipe P2 are connected by the inner and outer connection pipes 100 and 200.

Meanwhile, before coupling the inner connection pipe 100 to the outer connection pipe 200 by sliding, the second O-ring 302 is installed on the outer circumferential surface of the connection pipe 101 of the inner connection pipe 100 and the outer circumferential surface of the pipe expanding part 102, and then the inner connection pipe 100 is inserted into and coupled to the outer connection pipe 200. In this way, as the second O-rings 302 are pressed, the gap between the connection pipe 101 and the outer connection pipe 200 and the gap between the pipe expanding part 102 and the outer connection pipe 200 are sealed by the second O-rings 302.

Also, the first O-ring 301 is installed on the outer surface of the second pipe P2, and thus, when the outer connection pipe 200 is fastened to the outer circumferential surface of the second pipe P2, as the first O-ring 301 is pressed, the gap between the second pipe P2 and the outer connection pipe 200 is sealed.

Then, after the first and second pipes P1 and P2 are connected using the inner and outer connection pipes 100 and 200 as described above, a fluid passes through the first and second pipes P1 and P2 and the inner and outer connection pipes 100 and 200 to allow the fluid to flow.

On the other hand, when the diameters of the inner circumferential surfaces of the first and second pipes P1 and P2 are formed to be relatively smaller than the diameter of the connection pipe 101 of the inner connection pipe 100, the adapter 103 is positioned between the inner connection pipe 100 and the first pipe P1, one end of the adapter 103 is coupled by sliding to surround the outer circumferential surface of the first pipe P1, and the connection pipe 101 is inserted into and coupled to the other end of the adapter 103 to connect the first pipe P1 and the inner connection pipe 100 and connect the first and second pipes P1 and P2.

In the above-described structure in which the first and second pipes P1 and P2, which are formed by cutting out a damaged part of a pipe, are connected using the inner and outer connection pipes 100 and 200, whose length is extended and fixed, by sliding the inner and outer connection pipes so that the detachment preventing protrusion 202 is caught in and fixed to the detachment preventing groove 101*a*, the pipe connection device may be easily inserted between first and second pipes P1 and P2 by adjusting the length of the inner and outer connection pipes 100 and 200, the length of the inner and outer connection pipes 100 and 200 may be easily adjusted to be proportional to a length between the first and second pipes P1 and P2 by sliding the inner and outer connection pipes 100 and 200, and an insertion depth of the inner and outer connection pipes 100 and 200 may be limited by limiting a sliding distance of the inner and outer connection pipes 100 and 200 as the outer catching step 102*a* of the inner connection pipe 100 and the inner catching step 201 of the outer connection pipe 200 are caught on and fixed to each other. In particular, since the detachment preventing protrusion 202 of the outer connection pipe 200 is caught in and fixed to the detachment preventing groove 101*a* of the inner connection pipe 100, the inner and outer connection pipes 100 and 200 are fixed while the length thereof is extended.

According to the present disclosure, a pipe connection device for repairs can be easily inserted between first and second pipes by adjusting length of inner and outer connection pipes, the length of the inner and outer connection pipes can be easily adjusted to be proportional to a length between the first and second pipes by sliding the inner and outer connection pipes, and an insertion depth of the inner and outer connection pipes can be limited by limiting a sliding distance of the inner and outer connection pipes as an outer catching step of the inner connection pipe and an inner catching step of the outer connection pipe are caught on and fixed to each other. In particular, since a detachment preventing protrusion of the outer connection pipe is caught in and fixed to a detachment preventing groove of the inner connection pipe, the inner and outer connection pipes are fixed while the length thereof is extended, and since the first and second pipes are connected using the inner and outer connection pipes whose length is extended, there is no concern that the length of the inner and outer connection pipes may be reduced due to sliding thereof. Accordingly, maintenance and repair of the first and second pipes can be easily performed using the inner and outer connection pipes, and there is an advantage in that product reliability is improved.

The pipe connection device for repairs according to the present disclosure which has been described above is not limited to the above-described embodiments. Various modifications may be made by those of ordinary skill in the art to which the present disclosure pertains without departing from the gist of the present disclosure claimed in the appended claims, and such modifications also belong to the technical spirit of the present disclosure.

What is claimed is:

1. A pipe connection device for repairs, the pipe connection device comprising:

an inner connection pipe (100), which has a hollow shape whose front and rear portions are open and has a connection pipe (101) formed at one end in order to be inserted into a first pipe (P1) cut to have a predetermined length, a detachment preventing groove (101*a*) formed to be recessed along an outer surface of the connection pipe (101), and a pipe expanding part (102) formed to expand at a rear end of the connection pipe (101) and forming an outer catching step (102*a*) between the connection pipe (101) and the pipe expanding part (102); and an outer connection pipe (200), which has a hollow shape whose front and rear portions are open, is inserted and coupled to surround an outer surface of the inner connection pipe (100), and has a detachment preventing protrusion (202) formed to protrude along an inner circumferential surface of one end to correspond to the detachment preventing groove (101*a*) and be caught in and fixed to the detachment preventing groove (101*a*), the other end fastened to surround an outer surface of a second pipe (P2), which is cut and faces the first pipe (P1), to connect the inner connection pipe (100) and the second pipe (P2), and an inner catching step (201) formed on an inner circumferential surface in order to be caught on the outer catching step (102*a*) and prevent the inner connection pipe (100) from being inserted to a predetermined depth or more into the outer connection pipe (200).

2. The pipe connection device of claim 1, wherein:

the detachment preventing groove (101*a*) of the inner connection pipe (100) is formed as a plurality of detachment preventing grooves (101*a*) spaced apart at predetermined intervals in a longitudinal direction of the outer surface of the inner connection pipe (100);

and the detachment preventing protrusion (202) of the outer connection pipe (200) is formed as a plurality of detachment preventing protrusions (202) that are proportional to the number of detachment preventing grooves (101*a*), spaced apart at predetermined intervals, and caught in the detachment preventing grooves (101*a*).

3. The pipe connection device of claim 1, wherein the detachment preventing groove (101*a*) is formed to be recessed in a polygonal shape to allow the detachment preventing protrusion (202) to be inserted thereinto and prevent the detachment preventing protrusion (202) from being detached.

4. The pipe connection device of claim 2, wherein the detachment preventing groove (101*a*) is formed to be recessed in a polygonal shape to allow the detachment preventing protrusion (202) to be inserted thereinto and prevent the detachment preventing protrusion (202) from being detached.

5. The pipe connection device of claim 1, wherein the outer connection pipe (200) further includes a limiting step part (203) configured to force the other end of the pipe expanding part (102) of the inner connection pipe (100) to be caught on a rear end of the inner catching step (201) to block the inner connection pipe (100) from moving backward toward the other end of the outer connection pipe (200).

6. The pipe connection device of claim 5, wherein the limiting step part (203) further includes:

an inclined surface portion (203*a*) formed to extend to be inclined downward from the inner circumferential surface of the outer connection pipe (200) toward a central portion thereof to guide the pipe expanding part (102) of the inner connection pipe (100) to move over the inclined surface portion (203*a*); and a perpendicular surface portion (203*b*) formed to be perpendicular from a tip of the inclined surface portion (203*a*) toward the inner circumferential surface of the outer connection pipe (200) to cause the other end of the pipe expanding part (102) of the inner connection pipe (100) to come in close contact with and be caught on the perpendicular surface portion (203*b*).

7. The pipe connection device of claim 1, wherein the outer connection pipe (200) further includes an insertion limiting step (204) formed to be recessed from an inner circumferential surface of a rear end toward an outer circumferential surface thereof and allow the second pipe (P2) to be caught thereon to limit a depth to which the outer connection pipe (200) is inserted toward the second pipe (P2).

8. The pipe connection device of claim 1, wherein:

the inner connection pipe (100) has a first O-ring (301) formed in a gap between the connection pipe (101) and the first pipe (P1) to prevent a fluid from leaking through the gap between the first pipe (P1) and the connection pipe (101); and the outer connection pipe (200) has a first O-ring (301) formed in a gap with the second pipe (P2) to prevent the fluid from leaking through the gap with the second pipe (P2).

9. The pipe connection device of any one of claim 1, wherein a second O-ring (302) is installed in a gap between the outer connection pipe (200) and the connection pipe (101) of the inner connection pipe (100) and a gap between the outer connection pipe (200) and the pipe expanding part (102) of the inner connection pipe (100) to prevent the fluid from leaking through the gaps between the inner and outer connection pipes (100, 200).

10. The pipe connection device of any one of claim 8, wherein a second O-ring (302) is installed in a gap between the outer connection pipe (200) and the connection pipe (101) of the inner connection pipe (100) and a gap between the outer connection pipe (200) and the pipe expanding part (102) of the inner connection pipe (100) to prevent the fluid from leaking through the gaps between the inner and outer connection pipes (100, 200).

11. The pipe connection device of claim 1, wherein the inner connection pipe (100) further includes an adapter (103), which has a hollow shape whose front and rear portions are open and has one end inserted and fastened to surround an outer surface of the first pipe (P1) and the other end into which one end of the connection pipe (101) is allowed to be inserted and fastened to connect the first pipe (P1) and the connection pipe (101).

\* \* \* \* \*